(12) United States Patent
Waelder (10) Patent No.: US 10,722,909 B1
(45) Date of Patent: Jul. 28, 2020

(54) SYSTEM AND METHOD OF DELIVERING REACTIVE FLUIDS TO AN APPLICATOR

(71) Applicant: Paul Charles Waelder, Syracuse, NY (US)

(72) Inventor: Paul Charles Waelder, Syracuse, NY (US)

(*) Notice: Subject to any disclaimer, the term of this patent is extended or adjusted under 35 U.S.C. 154(b) by 0 days.

(21) Appl. No.: 16/177,969

(22) Filed: Nov. 1, 2018

(51) Int. Cl.
*B05B 7/00* (2006.01)
*B05B 7/24* (2006.01)
*B05B 7/04* (2006.01)
*B05B 7/12* (2006.01)
*B05B 7/02* (2006.01)

(52) U.S. Cl.
CPC ......... *B05B 7/0081* (2013.01); *B05B 7/0093* (2013.01); *B05B 7/025* (2013.01); *B05B 7/0408* (2013.01); *B05B 7/1209* (2013.01); *B05B 7/24* (2013.01)

(58) Field of Classification Search
CPC ..... B05B 7/0081; B05B 7/025; B05B 7/1209; B05B 7/24; B05B 7/0093; B05B 7/0408
USPC .... 222/145.5, 145.6, 145.1, 396, 397, 400.7
See application file for complete search history.

(56) References Cited

U.S. PATENT DOCUMENTS

| | | | |
|---|---|---|---|
| 2,946,488 A | 7/1960 | Kraft | |
| 3,072,462 A | 1/1963 | Anderson | |
| 3,469,788 A * | 9/1969 | Glaros | B05B 9/04 137/210 |
| 3,512,676 A * | 5/1970 | Brown | B65D 39/086 220/620 |
| 4,535,919 A | 8/1985 | Jameson | |
| 4,809,909 A | 3/1989 | Kukesh | |
| 5,163,584 A * | 11/1992 | Huber | B29B 7/7678 222/1 |
| 5,224,629 A * | 7/1993 | Hsich | B05C 17/00513 222/137 |
| 5,362,342 A * | 11/1994 | Murray | B29B 7/7678 156/575 |
| 5,366,309 A * | 11/1994 | Springall | B05C 5/02 118/108 |
| 5,526,957 A * | 6/1996 | Brown | B29B 7/7404 222/94 |
| 7,044,402 B2 * | 5/2006 | Finn | B29B 7/761 222/135 |
| 7,350,672 B1 * | 4/2008 | Gerich | B05B 7/0408 137/607 |
| 7,753,290 B2 * | 7/2010 | Jacques | A01M 7/0046 239/329 |
| 2003/0150872 A1 * | 8/2003 | Huber | B05B 7/0408 222/1 |
| 2006/0188314 A1 * | 8/2006 | Hunter | B05C 17/00553 401/48 |
| 2007/0187434 A1 * | 8/2007 | Schrafel | B05B 7/0408 222/459 |

(Continued)

OTHER PUBLICATIONS

Master Pack, Spray Foam Insulation Equipment Rental, Master Pack, Dec. 31, 2017, www.masterpkg.com/spray-foam-equipment-for-rent/.

(Continued)

*Primary Examiner* — Donnell A Long (57) ABSTRACT

The present invention relates to a system of delivering at least two different reactive fluids to an applicator utilizing a pressurized gas. A method of delivery is also disclosed.

18 Claims, 10 Drawing Sheets

(56) References Cited

U.S. PATENT DOCUMENTS

2015/0129615 A1* 5/2015 Bates ................... B65D 81/325
222/145.5
2015/0314309 A1 11/2015 Abbale

OTHER PUBLICATIONS

Seal Boss, Epoxy Pump, Epoxy Injection Pump, Epoxy Machine, Epoxy Injection Machine, Seal Boss Corp., Aug. 30, 2018, www.sealboss.com/epoxypump.php.

* cited by examiner

SYSTEM AND METHOD OF DELIVERING REACTIVE FLUIDS TO AN APPLICATOR

FIELD OF THE INVENTION

The present invention relates to a system and method of delivering at least two reactive fluids from separate reservoirs to an applicator. In a more particular, limited form, the present invention relates to a system and method of delivering a two-part epoxy resin for use as an adhesive.

BACKGROUND OF THE INVENTION

Two-part epoxy adhesive resins are well-known and consist of a fluid resin and a fluid hardener that are maintained separately prior to use and then are joined and mixed to create an adhesive material. The mixed material is initially in a fluid state and then cures or hardens.

Commercially available delivery systems for relatively small projects needing adhesion typically utilize an applicator comprising (1) a hand-held, two-chamber tube with one chamber containing the resin and the other chamber containing the hardener, and (2) a bifurcated, two-section, manually operated plunger that, when depressed, causes both the resin and the hardener to move within and from the associated chamber and to be dispensed from an associated nozzle at a depending end of each chamber such that the two fluids are moved outside the chambers and are adjacent to each other. When the resin and the hardener are thus dispensed, one mixes the two fluids, which become tacky and function as an adhesive. By placing objects in contact with the mixed fluids, the objects will adhere, and will permanently adhere once the mixed fluids cure or harden.

Commercially available delivery systems for relatively large projects operate in a similar manner; however, relatively large quantities of fluids are employed and electrically actuated, mechanical pumps are used to move the resin and the hardener from associated tanks or reservoirs. The two fluids are moved by the pumps through hoses and to a nozzle for dispensing onto a surface for adhesion. A drawback of these larger systems is that the fluids tend to gum up within the impellers or rotors of one or more of the pumps, especially when the system is unused for several hours, often to such a degree that the pumps fail to operate. Such pump failures cause wasteful down time on projects and usually result in the pump being discarded rather than repaired. Also, pump components such as clutches may fail. A further drawback of such systems is that the electrical systems may also fail, such as a blown fuse or a complete loss of electric power due to lightning strikes in the area, which may interrupt a project while the problem is being assessed and solved. Another drawback of such systems is that they typically operate at relatively high pressures (such as 350 psi), which place severe stress on system components, and present safety issues, or which require relatively heavy-duty, expensive components.

SUMMARY OF THE INVENTION

The present invention relates to a system of delivering at least two different reactive fluids to an applicator utilizing a pressurized gas. A method of delivery is also disclosed.

The preferred inventive delivery system utilizes no electricity and no pumps, thereby obviating many of the problems associated with the above-described large-delivery commercial systems. The preferred system also operates at relatively low pressures such as thirty-five psi.

The system preferably includes a source, such as a tank, of pressurized gas, a first barrel containing the resin, a second barrel containing the hardener, a tube selectively connected at one end to and in operative communication with the gas tank and at the other end in communication with the interior of each barrel, a delivery hose, and a delivery gun or nozzle. A pressure regulator, a pressure safety valve, a pressure gauge, and a gate valve are in communication with the tube as it exits from connection to the gas tank. Thereafter the tube diverges into two branches, with the end of each branch disposed into the top of an associated one of the barrels. Preferably each tube branch end is selectively secured to the top of an associated barrel such as via a threaded connector whereby the ends may each be quickly detached from the top of an associated barrel when that barrel is depleted of fluid and may be quickly connected to the top of a new barrel filled with fluid. The delivery hose includes two branches with the end of a branch extending through the top of an associated barrel and depending down to the bottom of the barrel. The delivery hose branches are each removably secured to an associated barrel such as by a threaded coupling. Each branch detachably joins at a delivery valve or gate disposed in the delivery nozzle.

In operation, the pressurized gas acts through the tube to pressurize the interior of each barrel, which in turn causes fluid within each barrel to flow into the end of an associated branch of the delivery hose disposed at the bottom of the barrel. When the delivery valve in the nozzle is open (and the gate valve is open), the fluid will flow from the barrels into the hose branches, and then into the nozzle for dispensing onto a surface for adhesion. When the delivery valve is closed (or when the gate valve is closed), the fluids will not travel through the delivery hose and into the nozzle.

The pressurized gas is preferably inert or non-combustible, such as argon or carbon dioxide. When the gas is depleted from a tank, the tube may be quickly disconnected from the gas tank; a new tank of pressurized gas may be readily replace the depleted tank; and the tube may be quickly connected to the new tank.

The fluid-containing barrels may be standard 15 gallon metal drums or drums of any other capacity. The barrels may instead be flexible, collapsible bags. Preferably the barrels, bags, or other containers containing resin are colored different from the barrels, bags, or other containers containing hardener to help insure that the proper containers are used. As previously mentioned, depleted containers may be quickly replaced with full containers.

If the delivery hose should ever gum up and become clogged and unusable, the clogged hose may be readily disattached and removed from the barrels and the delivery nozzle, and a replacement hose may be readily inserted into and attached to the barrels and the delivery nozzle.

Preferably reinforcing plates are mounted above the top and below the bottom of each barrel so as to help insure the barrel will not rupture while under pressure. Preferably each reinforcing plate is circular and fits snugly within the area defined by a typical circumferential rim extending from the top and also the bottom of the barrel. A rotatable cam may selectively, forcibly contact the reinforcing plate on the top of a barrel to slightly compress the top and the bottom of the barrel and thereby prevent the top or bottom from bulging outwardly and possibly rupturing.

In those instances where the resin and hardener are not to be delivered in a 50/50 ratio, the tube branches may each be fitted with an adjustable valve so as to create different volumes of fluid flow from each of the barrels, which in turn will cause fluids to flow from each barrel at different rates and cause different amounts of resin and hardener to be released through the delivery valve and into the nozzle. Similarly, if the resin and the hardener possess different viscosities, the adjustable valves may adjust the pressures in each barrel so as to cause the fluid flow rates to be adjusted and to achieve the desired ratio of fluids to be mixed.

The preferred inventive system also contemplates a rollable trolley or cart for supporting and transporting the gas tank, the barrels, and the cam, which may be rotatably mounted on the cart.

The system may be used, for example, in applying the mixed resin and hardener on a rooftop and then placing one of more insulation panels over the rooftop such that the mixed resin and hardener adhesive is compressed and in intimate contact with both the rooftop and the panels, thereby permanently securing the panels to the rooftop. Typically, the mixed resin and hardener has a cure time of about 15-30 minutes, and the panels should be placed over the rooftop within about 10-15 minutes after the mixed resin and hardener are dispensed from the nozzle and deposited on the rooftop.

BRIEF DESCRIPTION OF THE DRAWINGS

The invention will be described with reference to the accompanying drawings, wherein.

DESCRIPTION OF A PREFERRED EMBODIMENT

The present invention will be described with reference to the accompanying drawings wherein like reference numerals refer to the same item. It should be appreciated that the following description is intended to be exemplary only, and the scope of the invention envisions other variations and modifications of these particular exemplary embodiments.

Figure 1:
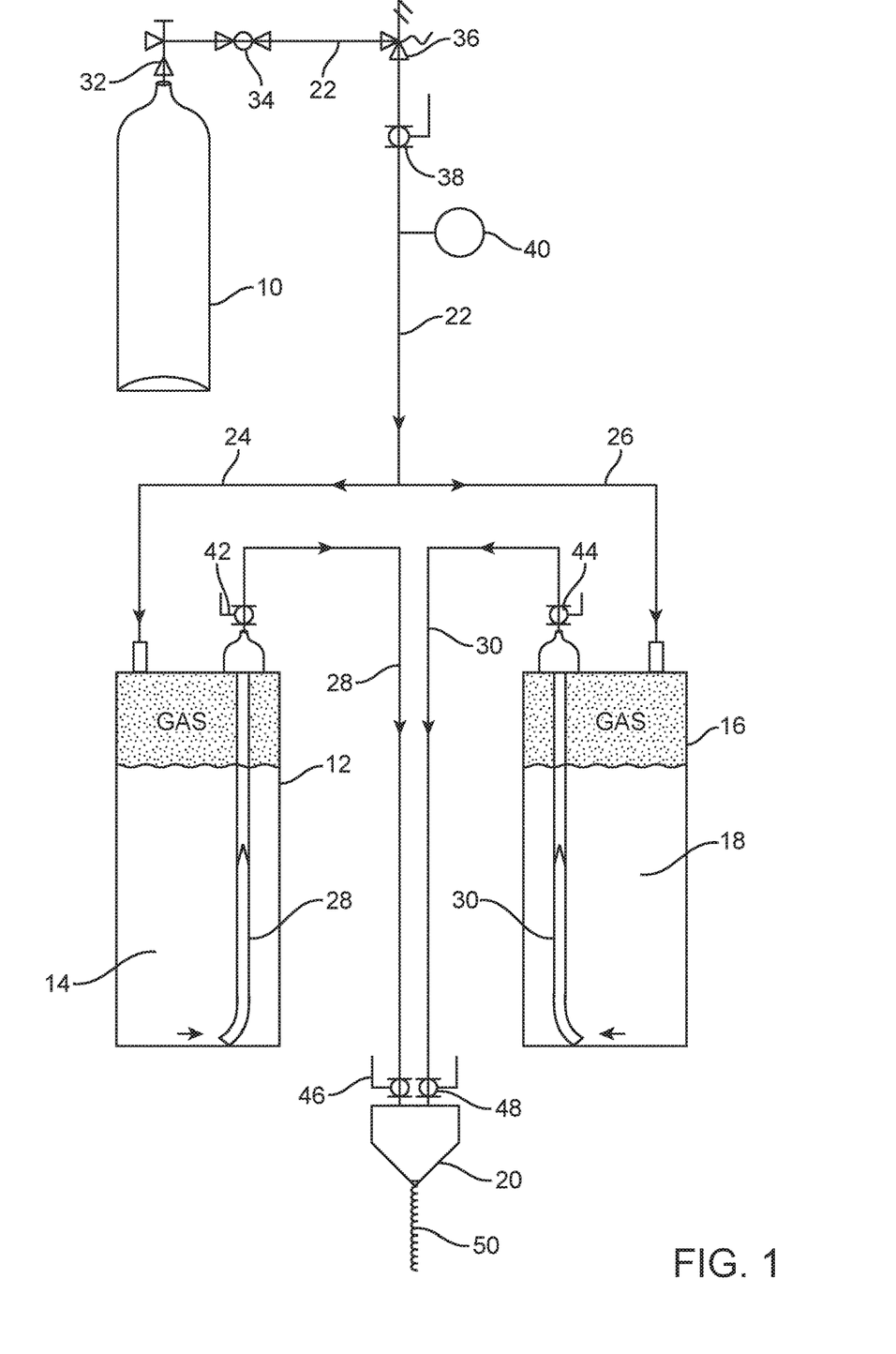
FIG. 1 is a schematic diagram of a system in accordance with one embodiment of the present invention.

FIG. 1 is a schematic diagram of a delivery system according to preferred embodiment of the present invention. The system includes a bottle of pressurized gas 10, a first tank 12, containing a first fluid 14, a second tank 16 containing a second fluid 18, and a dispensing applicator or nozzle 20. The system further includes a first conduit 22 removably fitted or coupled in a fluid tight seal at one end thereof to the gas bottle 10. The first conduit 22 then branches into a first conduit branch 24 to the top of the first tank 12 and through a second conduit branch 26 to the top of the second tank 16. The ends of the first conduit branch 24 and second conduit branch 26 are removably fitted or coupled in a fluid tight seal to the top longitudinal end of each tank 12, 16, respectively, such that the pressurized gas is carried into the respective tank 12, 16.

The system also includes a first delivery conduit 28 having an end disposed at the bottom of the first tank 14, extending through the top of longitudinal end of the tank 12 via a removable coupling or fitting in a fluid tight seal, and then extending to the dispensing applicator 20. Similarly, a second delivery conduit 30 has an end disposed at the bottom of the second tank 16, extends to the top longitudinal end of the second tank 16 through a removable fitting or coupling in a fluid tight seal, and to the dispensing applicator 20.

Figure 2:
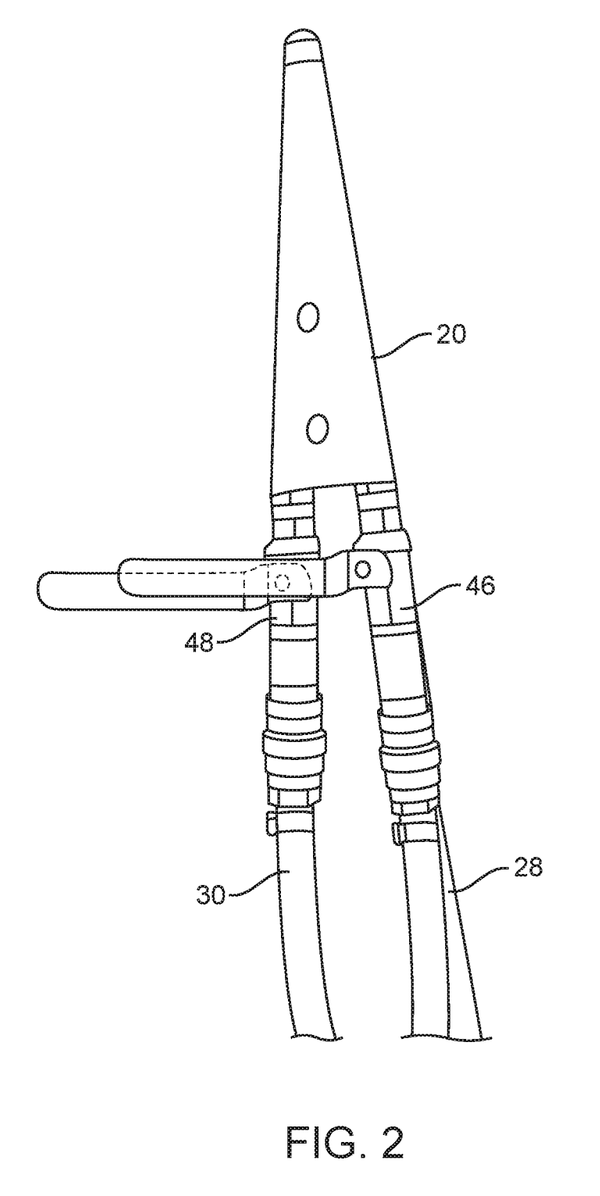
FIG. 2 is a plan view of a dispensing applicator may be used in the system shown in FIG. 1.

The first conduit 22 is preferably provided with an open/close valve 32 disposed at the top of the bottle 10, a pressure regulator 34, a safety valve 36, and open/close gate 38, and a pressure gauge 40. Similarly, the first delivery conduit 28 may be provided with an open/close valve 42 near the top of the first tank 12, and the second delivery conduit 30 may be provided with an open/close valve 44 near the top of the second tank 16. Further, the first delivery conduct 28 may be provided with an open/close valve 46 adjacent to the dispensing applicator 20, as best shown in FIG. 1 and FIG. 2, and the second delivery conduit 30 may be provided with an open/close valve 48 adjacent to the dispensing applicator 20, as also best shown in FIG. 1 and FIG. 2.

Although pressurized gas is contained in a replaceable tank 10 in accordance with a preferred embodiment of the present invention, the invention contemplates that one or more bottles of pressurized gas may be utilized and that conduits may extend directly from each tank of gas to an associated one of the tanks 12, 16. Also, although the pressurized gas is preferably contained in a replaceable tank 10, the invention contemplates the pressurized gas may be contained in a different type of container, or from a different reservoir or source. Also, preferably, the gas is in the nature of the noncombustible gas and a gas that possesses very low chemical reactivity, such as a noble gas or as inert gas. Very preferably, the source of pressurized gas is not ambient air, since such air contains moisture, which might have a deleterious effect on the fluids 14, 18 contained in the tanks 12, 16, respectively.

In a preferred embodiment, the fluids 14, 18 are constituted of different materials, which, when brought in contact with each other, create a tacky adhesive. For example, the fluid 14 may be epoxy resin or urethane, and the fluid 18 may be a hardener. Epoxy resins are low molecular weight pre-polymers or higher molecular weight polymers which normally contain at least two epoxide groups. In general, uncured epoxy resins possess relatively poor mechanical, chemical, and heat resistant properties. Better properties may be obtained by reacting the epoxy resin with suitable curatives to form three-dimensional cross-linked thermoset structures, commonly referred to as a curing or gelation process. Such curing may be achieved by forming a copolymer with polyfunctional curatives or hardeners. Some common classes of hardeners for epoxy resins include amines, acids, anhydrides phenols, alcohols, and thiols.

Although the present invention focuses on the mingling of the first fluid 14 and the second fluid 18 to form an adhesive, the invention broadly contemplates that the first fluid 14 and the second fluid 18 may be mingled for use as paints and other coatings, as well as for other purposes.

The invention further contemplates that a third tank and a third fluid may be employed with the system of the present invention and directed in a similar manner to the dispensing applicator 20 and that such third fluid, for example, might be an epoxy curing accelerator that quickens the curing of the epoxy resin. Such an accelerator may be, for example, tertiary amines, carboxylic acids, and alcohols. The invention contemplates in its broad aspects bringing together and mingling any number of a plurality of fluids.

The fluids 14, 18 are preferably liquids and may be in the form of a paste or gel. Typically the fluids employed with the invention have a higher viscosity than water, that is, the fluids are typically "thicker" than water.

The system of the present invention contemplates that the first conduit branch 24, the first tank 12, and the first delivery conduit 28 may be painted of the same color and that the second conduit branch 26, the second tank 16, and the second delivery conduit 30 may be painted a single, different color. By such a coloring scheme, when one of the tanks 12, 16 is depleted and needs to be replaced, a similarly colored tank, which contains the same fluid, may be connected to the proper, associated conduit branch and delivery conduits. Likewise, when a delivery conduit needs to be replaced.

Figure 3:
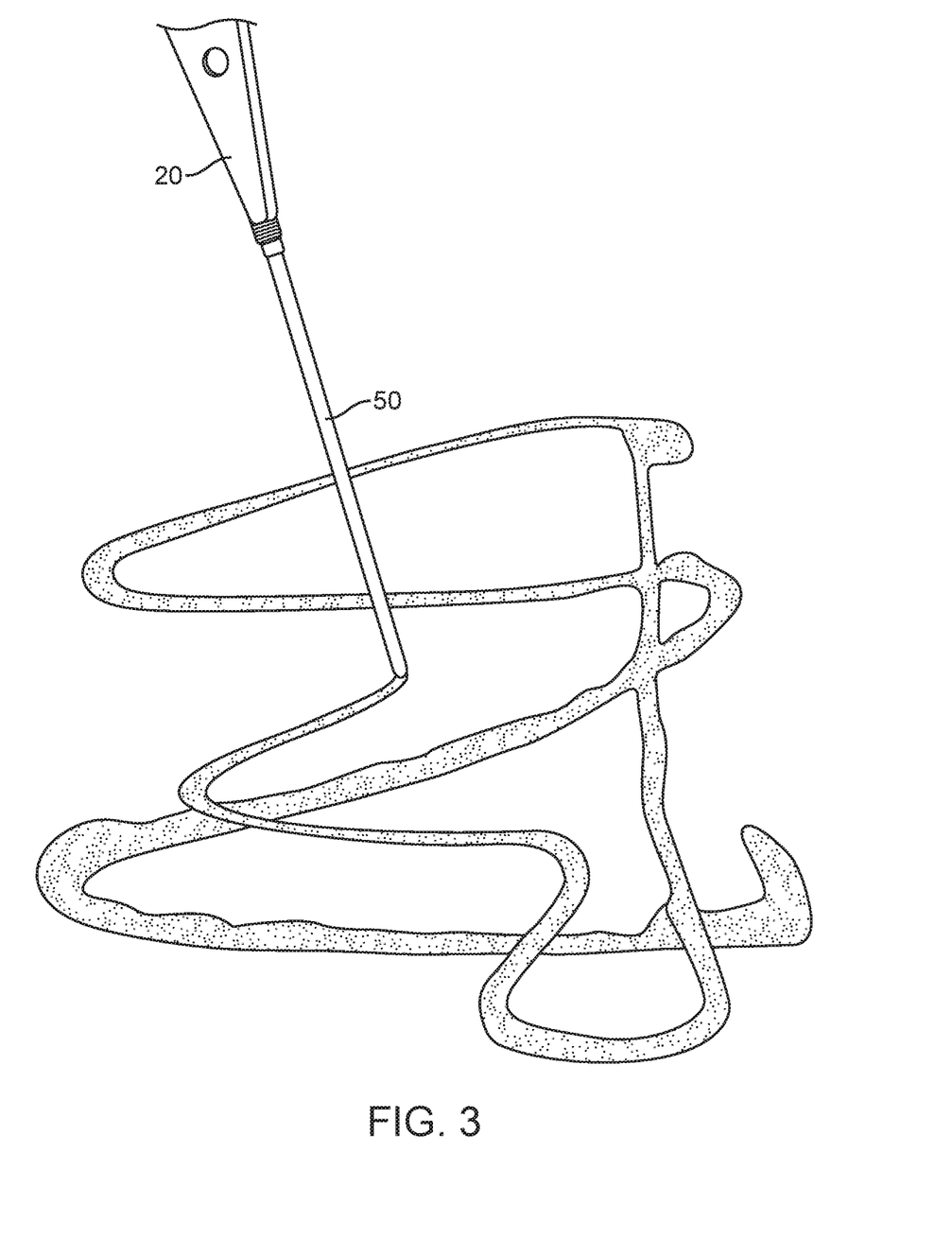
FIG. 3 is a schematic, perspective illustration of the dispenser applicator shown in FIG. 2 fitted with a dispensing tube in the process of applying an adhesive to a surface.
Figure 4:
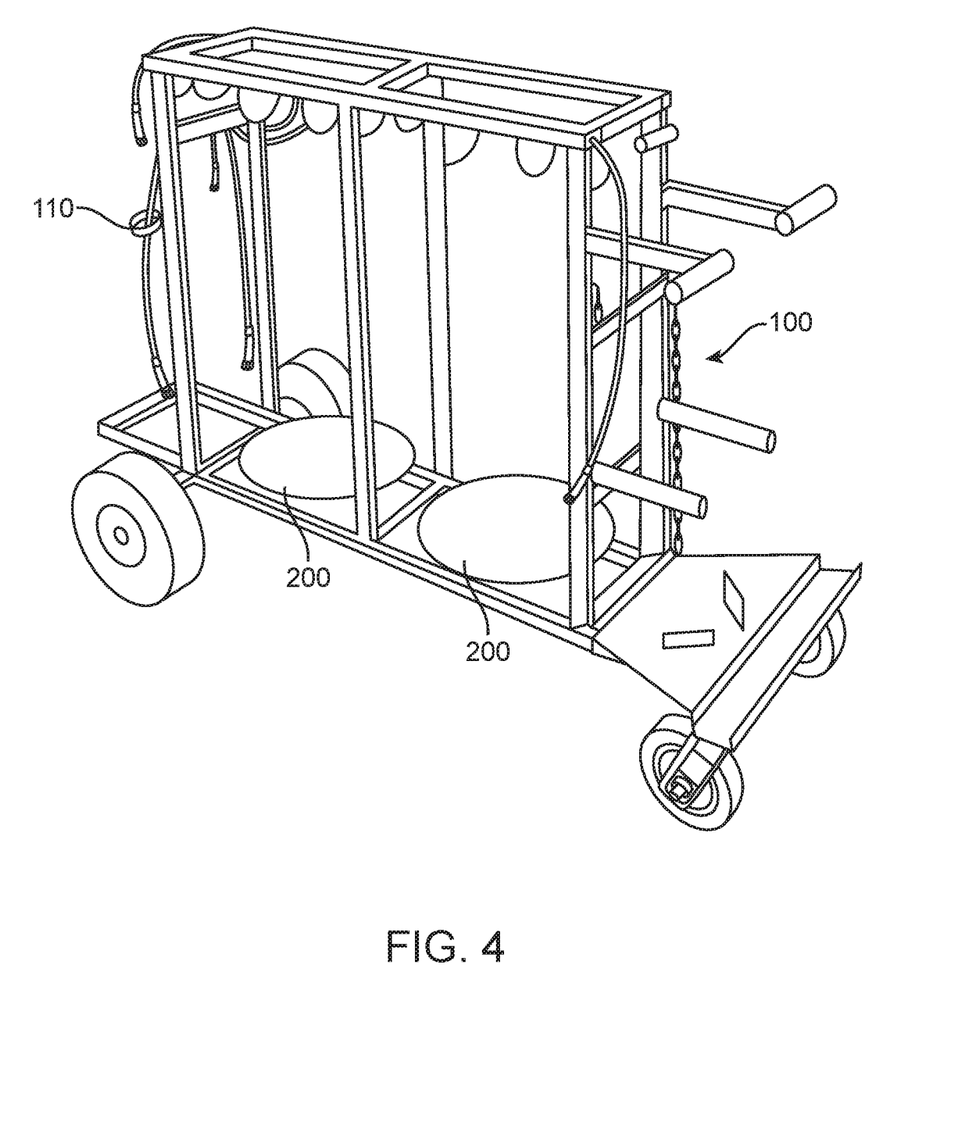
FIG. 4 is a perspective view of a cart that may be employed with the system as shown in FIG. 1.
Figure 5:
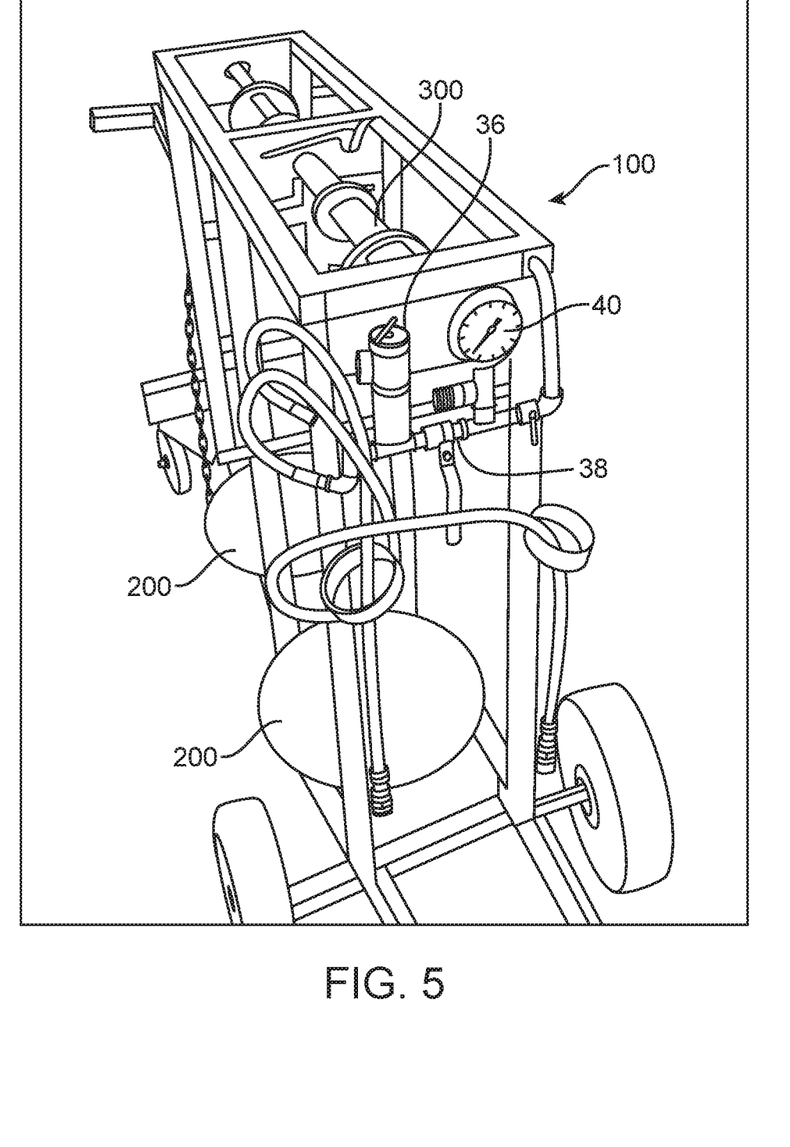
FIG. 5 is a different perspective view of the cart shown in FIG. 4 fitted with various hoses, valves, and gauges, and a cam shaft.
Figure 10:
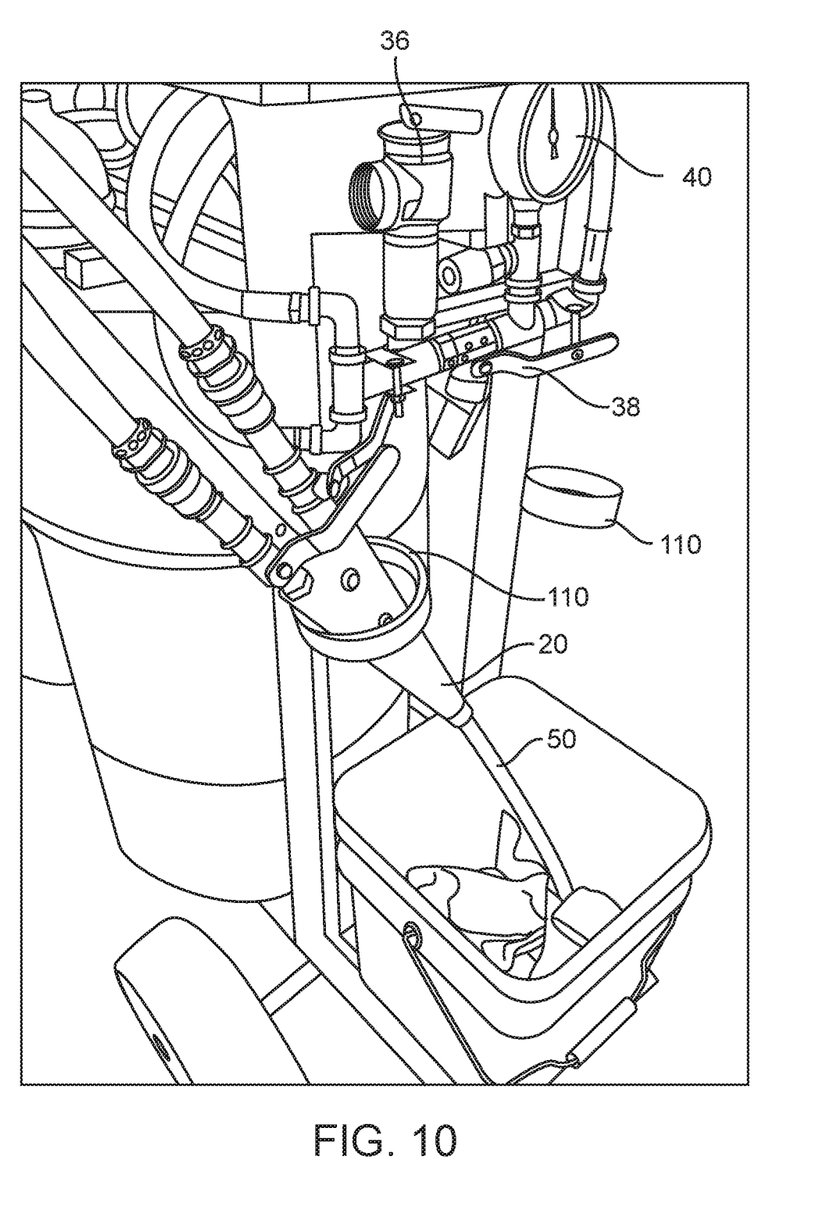
FIG. 10 is a partial, perspective view of the cart shown in FIGS. 4, 5, and 9 with a dispensing applicator and dispenser nozzle extending through and resting within a ring mounted on the cart.

In general operation, pressurized gas from the tank 10 is delivered through the first conduit 22 to each of the first branch conduit 24, and the second branch conduit 26, to the interior top of each of the first tank 12 and the second tank 16, respectively. The pressurized gas within the tanks 12, 16 forces the associated fluid 14, 18 in each tank 12, 16, respectively, to flow into the end of the associated delivery conduit 28, 30 disposed at the interior bottom of each tank 12, 16, respectively, and then flow through the associated delivery conduit 28, 30 to the dispensing applicator 20. When the two fluids 14, 18 reach the delivery applicator 20, the fluids 14, 18 come in contact with each other, are intermingled, and exit the dispensing applicator 20, which may be through a selectively replaceable delivery tube 50, as shown in FIGS. 3 and 10. Preferably the gas within each tank 12, 16 is maintained at a pressure in the range of eight to thirty-five psi during operation.

The invention contemplates that the first conduit branch 24, and the second conduit branch 26 may each be provided with a pressure regulator valve (not shown) to help regulate the pressurized gas that is carried to the interior of the associated tank 12, 16. Sometimes a pressure differential is desired in each tank 12, 16 so that a proper proportion of each fluid 14, 18 is delivered to a dispensing applicator 20. Alternatively, different sources of pressurized gas operating at different pressures may be connected through separate, independent conduits to the interior of an associated tank 12, 16.

It will be appreciated that the foregoing system requires no electricity and no motors or pumps. There is also no moving mechanical element that urges the fluid 14 or the fluid 18 to the dispensing applicator 20. Thus, the system is not dependent on electricity or fuel in order to operate and function.

The present invention also contemplates a mobile, manually movable cart 100, as best shown in FIGS. 4-10. The cart 100 may be provided with front wheels and rear wheels. The cart 100 generally includes a metal frame including a lower, generally horizontal supporting platform. The front of the platform is designed and adapted to carry and support the bottle 10 of pressurized gas. The middle and the rear of the platform is designed and adapted to carry and support the first tank 12 and the second tank 16. Further, the rear portion of the frame of the cart 100 may include a pair of rings 110 adapted to selectively receive the dispensing applicator 20 therein and therethrough, as shown in FIG. 10.

It will be appreciated that the cart 100 may carry and support the entire system as illustrated in FIG. 1, is independently and manually movable, and it does not require any electricity or motor to facilitate such movement.

Figure 6:
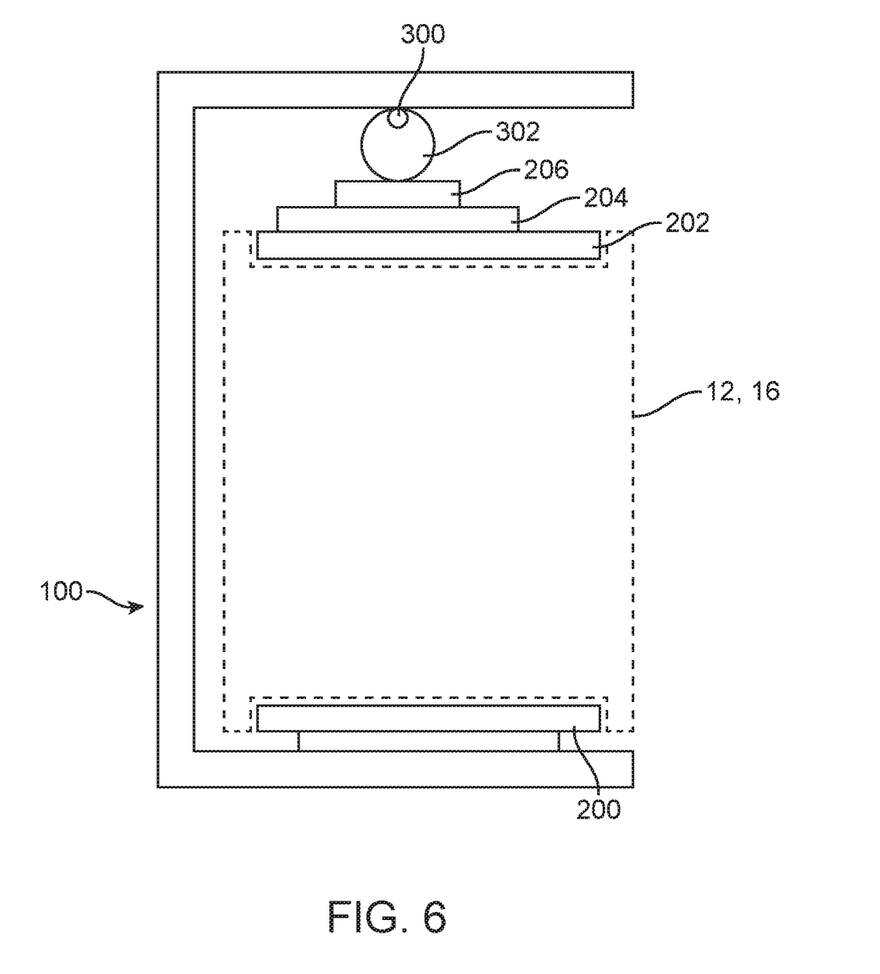
FIG. 6 is a schematic side illustration of a reinforcement plate system that may be employed with the cart shown in FIGS. 4 and 5.
Figure 7:
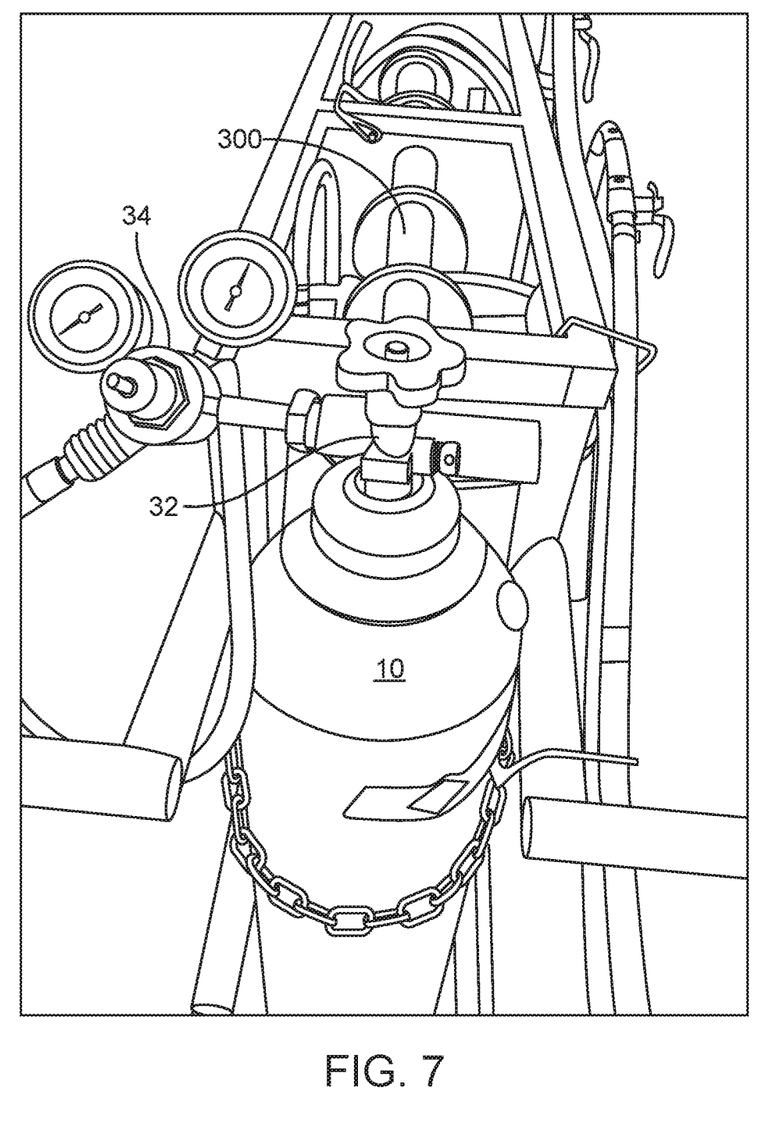
FIG. 7 is a perspective, partial view of the cart shown in FIGS. 4 and 5 on which a tank of pressurized gas has been mounted.
Figure 8:
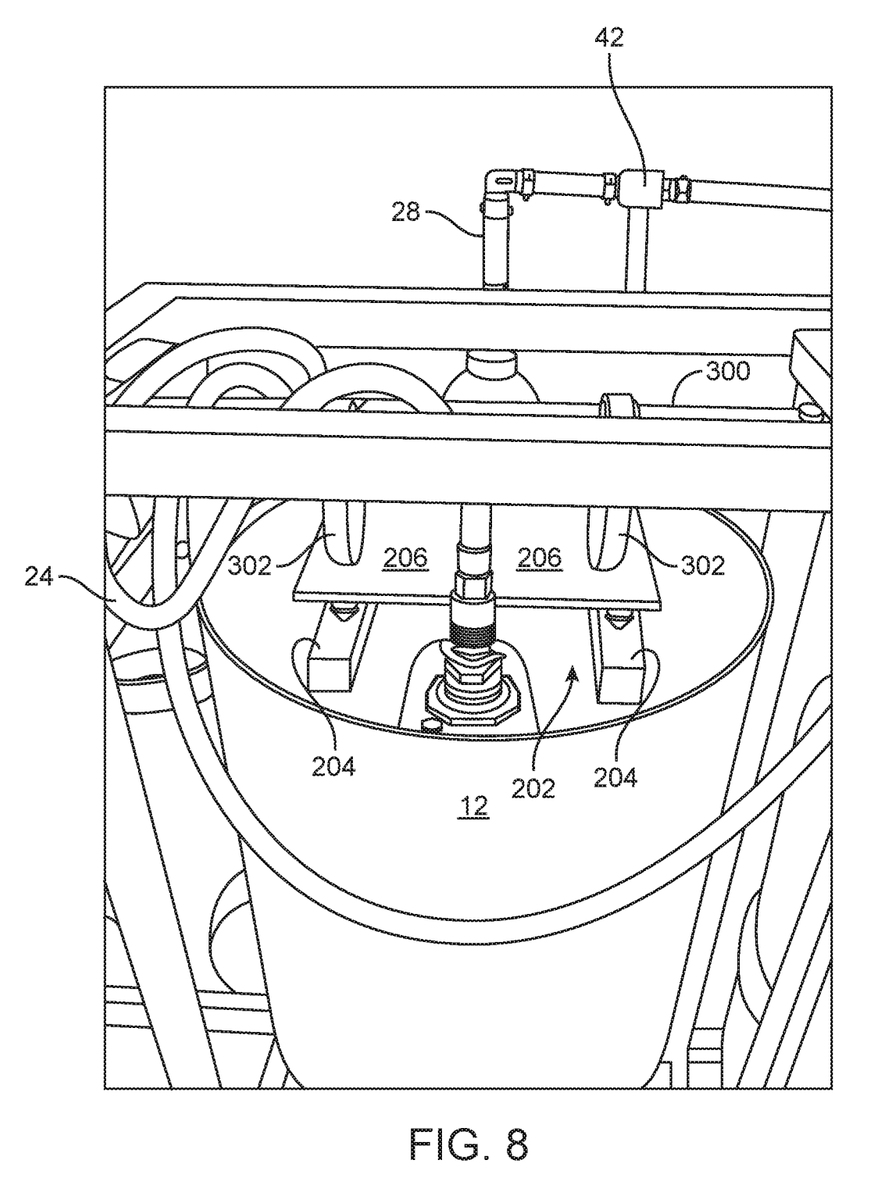
FIG. 8 is a perspective, partial view of the cart shown in FIGS. 4 and 5 with a tank of fluid, hoses, and an upper plate and cam shaft.

Typically the tanks 12, 16 are fashioned in the form of metal drums of a generally cylindrical configuration with a top longitudinal end and a bottom longitudinal end, with each of the ends recessed so as to form a peripheral, circular lip around each of the longitudinal ends of the drum as best shown in FIGS. 6 and 8. Because the pressurized gas acting within each of the tanks 12, 16 tends to cause the longitudinal ends of each barrel to bulge, which in turn may induce a rupture or other disintegration of the tank 12, 16, the invention contemplates a plate and cam shaft system designed to counteract any bulging of the longitudinal ends caused by the pressurized gas. As best shown in FIG. 6, the cart 100 includes a lower circular plate 200 adapted to abut the lower longitudinal end of an associated tank 12, 16 and to fit within the confines of the lip of each of the tanks 12, 16. Likewise, the cart 100 includes a substantially circular upper plate 202 adapted to abut and fit within confines of the lip of each tank 12, 16 at the upper longitudinal end of the associated tank 12, 16. The upper plate 202 may include cut-outs extending radially inward from the periphery thereof to accommodate the fittings or couplings of associated conduits 24, 26, 28, and 30, as best shown in FIG. 8, which permits the various conduits 24, 26, 28, 30 to be attached and disattached from the tanks 12, 16. A pair of spaced reinforcing bars 204 may be mounted and welded to the upper plate 202 as best shown in FIG. 8, and a cam contact plate 206 may be mounted and welded to the upper surfaces of the reinforcing bars 204, again as best shown in FIG. 8.

Preferably, the plates 200, 202 of the plate system are placed on the longitudinal ends of the tanks 12, 16 prior to any pressurized gas being delivered into the interior of the tank 12, 16.

Figure 9:
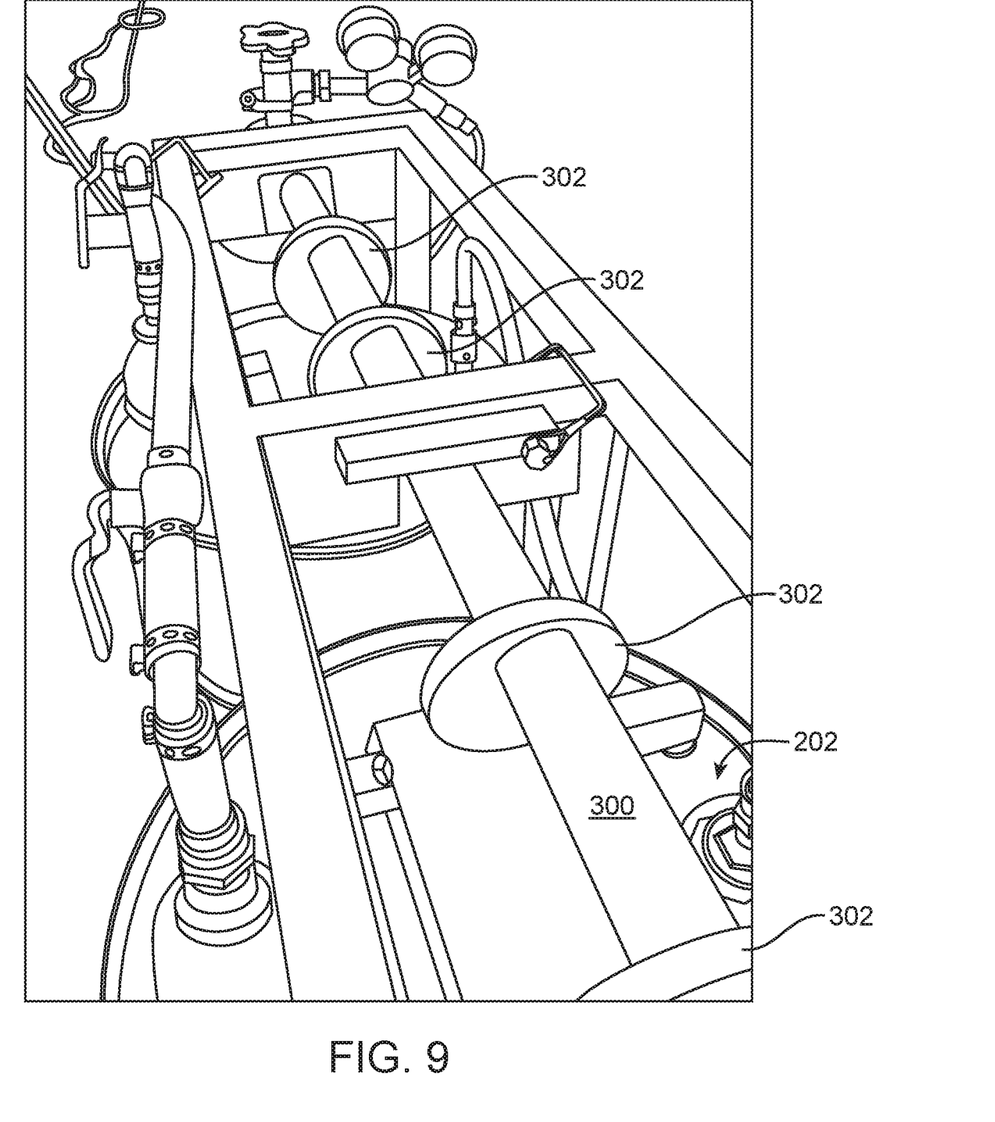
FIG. 9 is another partial, perspective view of the cart shown in FIG. 8.

The upper portion of each cart 100 is provided with a manually rotatable, horizontally extending shaft 300 on which a series of spaced cams 302 are fixably mounted. Preferably a pair of cams 302 is disposed above and adapted to be rotated into forceful contact with each cam plate 206, as best shown in FIGS. 6, 8, and 9. By selectively rotating the cam shaft 300 and by selectively positioning the rotation of each cam 302, the cams 302 may be brought into forceful contact with the cam contact plates 206 thus selectively compressing each longitudinal end of each tank 12, 16 between the upper plate 200 and the lower plate 202. By rotating the cam shaft 300, the cams 302 may be rotated out of position of forceful engagement with the cam plate 206, thereby enabling the upper plate 202, the reinforcement bars 204 and the cam plate 206 to be removed from the position above the respective tanks 12, 16, which will allow the tanks 12, 16 to be removed from a position on the carrier 12, possibly for the purpose of replacing either one of the depleted tanks 12, 16 with a new tank relatively full of fluid.

The invention contemplates other mechanisms for preventing the longitudinal ends of the tanks 12, 16 from bulging and the tanks 12, 16 from rupturing. In another embodiment, one or more metal pins (not shown) may extend above and horizontally across the cam contact plate 206, may be positioned in abutment with or slightly above the cam contact plate 206, and may selectively, slidably extend between slots or apertures in the cart frame. When the pins are slidably removed from the slots or apertures, the associated tank 12, 16 may be placed in or removed from a position above the lower plate 200, and when the pins are slid into the slots or apertures and horizontally extend across the cam contact plate 206, the pins will thereby present a stop or limit on any bulging. In yet another embodiment, a threaded rod (not shown) may extend vertically from and be welded at the lower end thereof to the cam contact plate 206. In this embodiment, the cam contact plate 206 floats above, and is not welded to the upper surface of the reinforcing bars 204. The threaded rod extends through and is threadably received in the cart frame, and the upper end of the threaded rod is provided with a horizontally extending handle. By rotating the handle, the threaded rod will rotate, which in turn will either raise or lower the cam contact plate, depending on the direction of handle rotation. When the cam contact plate 206 is in a raised position, the associated tank 12, 16 may be placed in or removed from a position above the lower plate 200, and when the cam contact plate 206 is in a lower position, it compresses the upper plate 202 against the upper longitudinal end of the tank 12, 16, thereby presenting a stop or limit on any bulging.

While exemplary embodiments have been presented in the foregoing description of the invention, it should be appreciated that a vast number of variations within the scope of the invention may exist. The foregoing examples are not intended to limit the nature or the scope of the invention in any way. Rather, the foregoing detailed description provides those skilled in the art with a foundation for implementing other exemplary embodiments of the invention.

I claim:

1. A system for delivering a plurality of reactive fluids to a delivery applicator, the system comprising:
    a first tank containing a first reactive fluid;
    a second tank containing a second reactive fluid, wherein the first reactive fluid and the second reactive fluid form a curing adhesive when intimately contacting each other;
    a source of pressurized gas selectively in communication with the interior of the first tank and the interior of the second tank;
    means for reinforcing each of the first tank and the second tank;
    means for selectively permitting or prohibiting the source of pressurized gas from communicating with the interior of the first tank and the interior of the second tank;
    a first conduit for carrying the first reactive fluid from the first tank to the delivery applicator;
    a second conduit for carrying the second reactive fluid from the second tank to the delivery applicator; and
    means for selectively permitting or prohibiting the first reactive fluid from entering the delivery applicator and for selectively permitting or prohibiting the second reactive fluid from entering the delivery applicator;
    wherein the system is devoid of any mechanically movable element for inducing movement of the first reactive fluid from the first tank through the first conduit and to the delivery applicator.

2. The system according to claim 1 wherein the system is devoid of any mechanically movable element for inducing movement of the second reactive fluid from the second tank through the second conduit and to the delivery applicator.

3. The system according to claim 2 wherein the system is devoid of any electrically activated element or internal combustion motor employed for moving either the first reactive fluid from the first tank toward the delivery applicator or the second reactive fluid from the second tank toward the delivery applicator.

4. The system according to claim 1 wherein the gas is other than ambient air.

5. The system according to claim 1 wherein each of the tanks is fashioned in a substantially cylindrical shape having two opposing, substantially planar, substantially co-parallel, longitudinal ends, and wherein said reinforcing means includes at least four substantially flat, circular plates each overlying and abutting an associated one of the longitudinal ends of the tanks.

6. The system according to claim 5 wherein the reinforcing means further includes a selectively rotatable cam shaft for selectively, forcibly acting on at least one of the plates on an associated longitudinal end of each of the tanks.

7. The system according to claim 6 wherein the source of pressurized gas includes at least one bottle of pressurized gas and wherein the system further includes a wheeled, mobile cart supporting and carrying the at least one bottle, the first tank, the second tank, the plates, and the cam shaft.

8. The system according to claim 1 further including means for adjusting the pressure of the pressurized gas acting on each of the first and second reactive fluids contained in an associated tank.

9. A system for delivering a plurality of reactive fluids to a delivery applicator, the system comprising:
    a first reservoir of a first reactive fluid;
    a second reservoir of a second reactive fluid, wherein the first reactive fluid and the second reactive fluid form a curing adhesive when intimately contacting each other;
    means for limiting the bulging of each of the first reservoir and the second reservoir;
    a delivery applicator in communication with the first reactive fluid and the second reactive fluid; and
    means for moving the first reactive fluid from the first reservoir and for moving the second reactive fluid from the second reservoir to the delivery applicator without using a mechanically movable element and without employing an electrically activated element or an internal combustion motor.

10. The system according to claim 9 further comprising a manually mobile cart, wherein the moving means includes at least one bottle of pressurized gas, and wherein the first reservoir, the second reservoir, and the bottle are mounted on the cart.

11. A method of delivering a plurality of reactive fluids to a delivery applicator, the method comprising:
    providing a first tank containing a first reactive fluid;
    providing a second tank containing a second reactive fluid, wherein the first reactive fluid and the second reactive fluid form a curing adhesive when intimately contacting each other;
    providing a source of pressurized gas selectively in communication with the interior of the first tank and the interior of the second tank;
    step for reinforcing each of the first tank and the second tank;
    providing a first conduit for carrying the first reactive fluid from the first tank to the delivery applicator;
    providing a second conduit for carrying the second reactive fluid from the second tank to the delivery applicator;

moving the first reactive fluid from the first tank through the first conduit and to the delivery applicator without the use of any mechanically moving element.

12. The method according to claim 11 comprising moving the second reactive fluid from the second tank through the second conduit and to the delivery applicator without the use of any mechanically moving element.

13. The method according to claim 12 further comprising maintaining the source of gas at a pressure within the range of about eight to thirty-five pounds per square inch in the interior of each of the tanks substantially consistently as the first reactive fluid is carried from the first tank to the delivery applicator and as the second reactive fluid is carried from the second tank to the delivery applicator.

14. The method according to claim 12 wherein the first reactive fluid is moved and the second reactive fluid is moved without employing any electrically activated element or internal combustion motor.

15. The method of claim 12 wherein moving the second reactive fluid is accomplished only by step for moving the second reactive fluid.

16. The method of claim 11 wherein moving the first reactive fluid is accomplished only by step for moving the first reactive fluid.

17. A method of delivering a plurality of reactive fluids to a delivery applicator, the method comprising:
    providing a first reservoir of a first reactive fluid;
    providing a second reservoir of a second reactive fluid, wherein the first reactive fluid and the second reactive fluid form a curing adhesive when intimately contacting each other;
    step for limiting the bulging of each of the first reservoir and the second reservoir;
    providing a delivery applicator in communication with the first reactive fluid and the second reactive fluid; and
    moving the first reactive fluid from the first reservoir to the delivery applicator and moving the second reactive fluid from the second reservoir to the delivery applicator without the use of any mechanically moving element and without employing electrically activated element or an internal combustion motor.

18. The method of claim 17 wherein moving the first reactive fluid is accomplished only by step for moving the first reactive fluid and wherein moving the second reactive fluid is accomplished only by step for moving the second reactive fluid.

\* \* \* \* \*